United States Patent
Zelig et al.

(10) Patent No.: US 7,545,740 B2
(45) Date of Patent: Jun. 9, 2009

(54) TWO-WAY LINK AGGREGATION

(75) Inventors: David Zelig, Givatayim (IL); Ronen Solomon, Givatayim (IL); Uzi Khill, Netanya (IL)

(73) Assignee: Corrigent Systems Ltd., Tel Aviv (IL)

( * ) Notice: Subject to any disclaimer, the term of this patent is extended or adjusted under 35 U.S.C. 154(b) by 461 days.

(21) Appl. No.: 11/279,045

(22) Filed: Apr. 7, 2006

(65) Prior Publication Data

US 2007/0237172 A1 Oct. 11, 2007

(51) Int. Cl.
*H04L 12/56* (2006.01)
(52) U.S. Cl. .................. 370/230; 370/235; 370/445
(58) Field of Classification Search .................. None
See application file for complete search history.

(56) References Cited

U.S. PATENT DOCUMENTS

| | | | |
|---|---|---|---|
| 3,411,507 A | 11/1968 | Wingrove |
| 4,535,785 A | 8/1985 | van den Honert |
| 4,573,481 A | 3/1986 | Bullara |
| 4,602,624 A | 7/1986 | Naples et al. |
| 4,608,985 A | 9/1986 | Crish |
| 4,628,942 A | 12/1986 | Sweeney et al. |
| 4,649,936 A | 3/1987 | Ungar |
| 4,702,254 A | 10/1987 | Zabara |
| 4,739,764 A | 4/1988 | Lue et al. |
| 4,867,164 A | 9/1989 | Zabara |
| 4,962,751 A | 10/1990 | Krauter |
| 5,025,807 A | 6/1991 | Zabara |
| 5,188,104 A | 2/1993 | Wernicke |
| 5,199,430 A | 4/1993 | Fang |
| 5,205,285 A | 4/1993 | Baker, Jr. |
| 5,215,086 A | 6/1993 | Terry, Jr. |
| 5,263,480 A | 11/1993 | Wernicke |
| 5,282,468 A | 2/1994 | Klepinski |
| 5,285,441 A | 2/1994 | Bansal et al. |

(Continued)

FOREIGN PATENT DOCUMENTS

WO WO-01/10375 A2 2/2001

OTHER PUBLICATIONS

Mamakos, et al., "A Method for Transmitting PPP Over Ethernet (PPPoE)", in IETF RFC 2516, Feb. 1999, p. 1-15.

(Continued)

*Primary Examiner*—Chi H. Pham
*Assistant Examiner*—Soon D Hyun
(74) *Attorney, Agent, or Firm*—Darby & Darby P.C.

(57) ABSTRACT

A method for communication includes coupling a network node to one or more interface modules using a first group of first physical links arranged in parallel. Each of the one or more interface modules is coupled to a communication network using a second group of second physical links arranged in parallel. A data frame having frame attributes sent between the communication network and the network node is received. A first physical link out of the first group and a second physical link out of the second group are selected in a single computation based on at least one of the frame attributes. The data frame is sent over the selected first and second physical links. This method allows two or more link aggregation groups to be concatenated, using a single processing stage to determine port assignment for each frame in each of the link aggregation groups.

31 Claims, 3 Drawing Sheets

U.S. PATENT DOCUMENTS

| | | | |
|---|---|---|---|
| 5,292,344 A | 3/1994 | Douglas | |
| 5,299,569 A | 4/1994 | Wernicke | |
| 5,335,657 A | 8/1994 | Terry, Jr. | |
| 5,423,872 A | 6/1995 | Cigaina | |
| 5,540,730 A | 7/1996 | Terry, Jr. | |
| 5,540,734 A | 7/1996 | Zabara | |
| 5,571,150 A | 11/1996 | Wernicke | |
| 5,690,691 A | 11/1997 | Chen et al. | |
| 5,707,400 A | 1/1998 | Terry, Jr. | |
| 5,716,385 A | 2/1998 | Mittal | |
| 5,755,750 A | 5/1998 | Petruska | |
| 5,836,994 A | 11/1998 | Bourgeois | |
| 6,026,326 A | 2/2000 | Bardy | |
| 6,083,249 A | 7/2000 | Familoni | |
| 6,091,992 A | 7/2000 | Bourgeois et al. | |
| 6,097,984 A | 8/2000 | Douglas | |
| 6,104,955 A | 8/2000 | Bourgeois | |
| 6,147,993 A | 11/2000 | Kloth et al. | |
| 6,151,297 A | 11/2000 | Congdon et al. | |
| 6,205,359 B1 | 3/2001 | Boveja | |
| 6,205,488 B1 | 3/2001 | Casey et al. | |
| 6,275,493 B1 | 8/2001 | Morris et al. | |
| 6,304,575 B1 | 10/2001 | Carroll et al. | |
| 6,339,595 B1 | 1/2002 | Rekhter et al. | |
| 6,466,985 B1 | 10/2002 | Goyal et al. | |
| 6,553,029 B1 | 4/2003 | Alexander | |
| 6,560,231 B1 | 5/2003 | Kawakami et al. | |
| 6,600,741 B1 | 7/2003 | Chrin et al. | |
| 6,604,136 B1 | 8/2003 | Chang et al. | |
| 6,624,917 B1 | 9/2003 | Paschal et al. | |
| 6,628,624 B1 | 9/2003 | Mahajan et al. | |
| 6,665,273 B1 | 12/2003 | Goguen et al. | |
| 6,735,198 B1 | 5/2004 | Edsall et al. | |
| 6,760,775 B1 | 7/2004 | Anerousis et al. | |
| 6,763,025 B2 | 7/2004 | Leatherbury et al. | |
| 6,765,921 B1 | 7/2004 | Stacey et al. | |
| 6,778,496 B1 | 8/2004 | Meempat et al. | |
| 6,788,681 B1 | 9/2004 | Hurren et al. | |
| 6,886,043 B1 | 4/2005 | Mauger et al. | |
| 6,963,578 B2 * | 11/2005 | Akahane et al. | 370/417 |
| 7,184,402 B1 | 2/2007 | Sharma et al. | |
| 2002/0176450 A1 | 11/2002 | Kong et al. | |
| 2003/0103449 A1 | 6/2003 | Barsheshet et al. | |
| 2004/0008687 A1 | 1/2004 | Matsubara | |
| 2004/0017816 A1 | 1/2004 | Ishwar et al. | |
| 2004/0107285 A1 | 6/2004 | Larson et al. | |
| 2004/0156313 A1 | 8/2004 | Hofmeister et al. | |
| 2004/0202171 A1 | 10/2004 | Hama | |
| 2004/0228278 A1 | 11/2004 | Bruckman et al. | |
| 2005/0125490 A1 | 6/2005 | Ramia | |
| 2005/0163115 A1 | 7/2005 | Dontu et al. | |
| 2005/0180171 A1 | 8/2005 | Huang et al. | |
| 2007/0038767 A1 | 2/2007 | Miles et al. | |
| 2008/0031263 A1 | 2/2008 | Ervin et al. | |

OTHER PUBLICATIONS

Rosen, et al., "Multiprotocol Label Switching Architecture" in Request for Comments (RFC) 3031 of the Internet Engineering Task Force (IETF), Jan. 2001 p. 1-54. Also available at www.ietf.org/rfc.html.

Tsiang, D. et al., "The Cisco SRP MAC Layer Protocol" in Request for Comments (RFC) 2892 of the Internet Engineering Task Force (IETF), Aug. 2000 p. 1-46.

Malkin, G. "RIP version 2", RFC 2453, Nov. 1998, p. 1-39.

Finlayson, R. et al, "A Reverse Address Resolution Protocol", RFC 903, Jun. 1984, p. 1-5.

Bradley, et al., "Multiprotocol Interconnect over Frame Relay" in IETF RFC 1490, Jul. 1993, p. 1-31.

Baker, et al., "PPP Bridging Control Protocol (BCP)", in IETF RFC 1638, Jun. 1994, p. 1-25.

Deering, S., "Host Extensions for IP Multicasting", in RFC 1112, Aug. 1989, p. 1-15.

Plummer, D., "An Ethernet Address Resolution Protocol", in RFC 826, Nov. 1982, p. 1-8.

Clause 43 of IEEE Standard 802.3a, "Carrier Sense Multiple Access Method with Collision Detection (CSMA/CD) Access Method and Physical Layer Specifications" 2002 Edition.

* cited by examiner

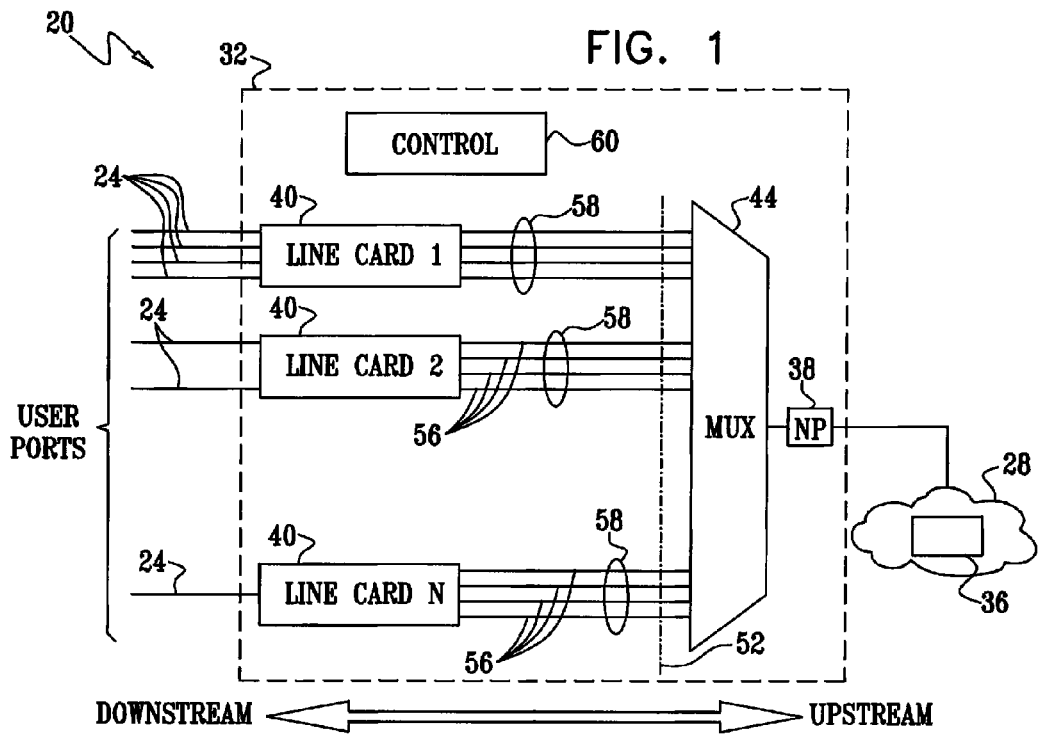
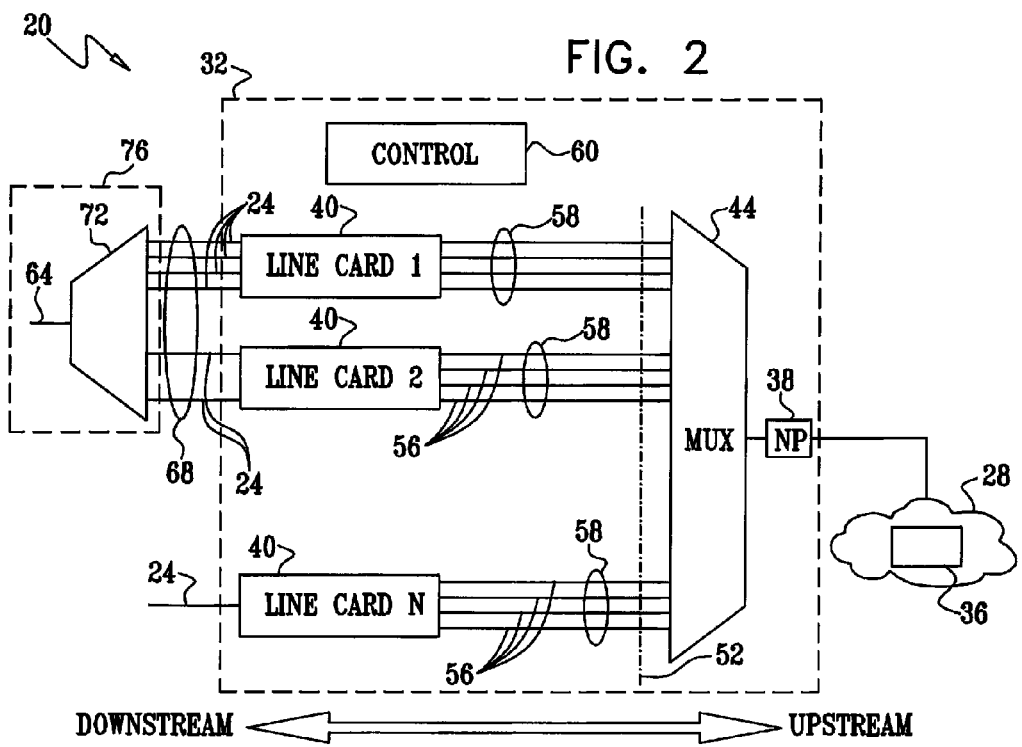

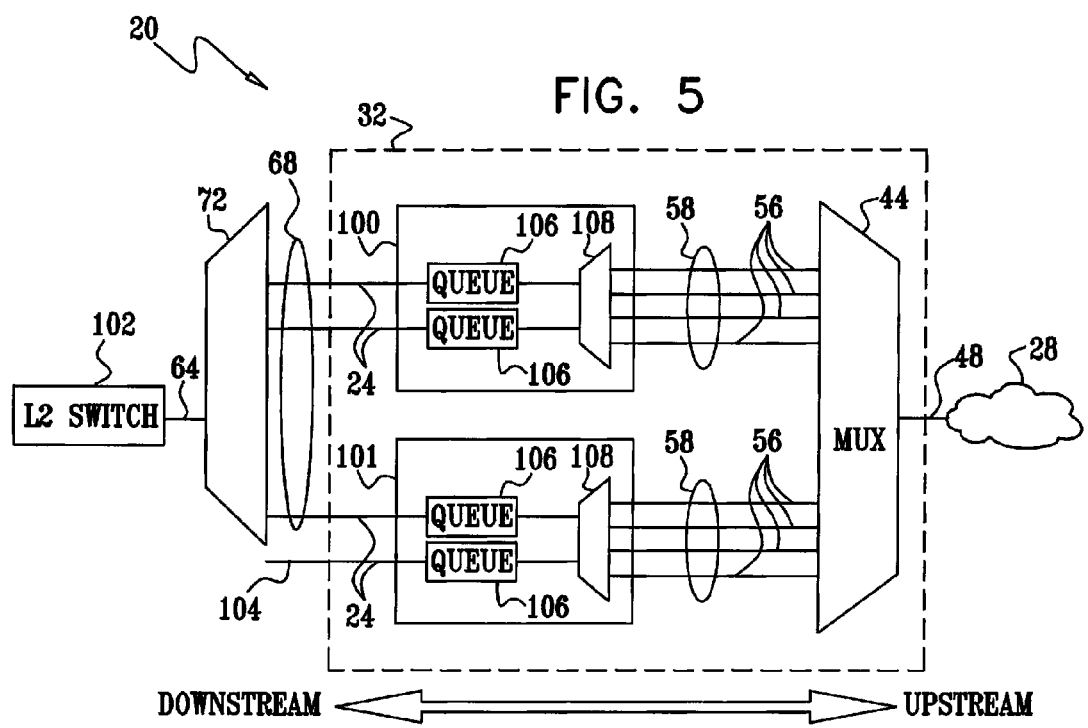

TWO-WAY LINK AGGREGATION

FIELD OF THE INVENTION

The present invention relates generally to communication networks, and particularly to methods and systems for link aggregation in network elements.

BACKGROUND OF THE INVENTION

Link aggregation (LAG) is a technique by which a group of parallel physical links between two endpoints in a data network can be joined together into a single logical link (referred to as the "LAG group"). Traffic transmitted between the endpoints is distributed among the physical links in a manner that is transparent to the clients that send and receive the traffic. For Ethernet™ networks, link aggregation is defined by Clause 43 of IEEE Standard 802.3ad, Carrier Sense Multiple Access with Collision Detection (CSMA/CD) Access Method and Physical Layer Specifications (2002 Edition), which is incorporated herein by reference. Clause 43 defines a link aggregation protocol sub-layer, which interfaces between the standard Media Access Control (MAC) layer functions of the physical links in a link aggregation group and the MAC clients that transmit and receive traffic over the aggregated links. The link aggregation sub-layer comprises a distributor function, which distributes data frames submitted by MAC clients among the physical links in the group, and a collector function, which receives frames over the aggregated links and passes them to the appropriate MAC clients.

SUMMARY OF THE INVENTION

In various communication applications, users connect to a communication network through a network element, such as an access concentrator or aggregator for obtaining different data services.

Embodiments of the present invention that are described hereinbelow provide improved methods and systems for connecting users to a communication network with increased capacity and quality of service. The network element comprises one or more user interface modules (UIMs), each serving one or more user ports. In some embodiments, each UIM is connected to the communication network using two or more physical links arranged in parallel, in order to provide sufficient bandwidth at a given quality-of-service (QoS) level.

Upstream data frames sent from the user ports to the communication network and downstream data frames sent from the communication network to the user ports are distributed among the parallel physical links, so as to balance the traffic load among the links. The load balancing enables each UIM, and the network element as a whole, to deliver a higher bandwidth at a given QoS or to improve the QoS at a given bandwidth.

In some embodiments, the UIMs are coupled to a backplane of the network element, and the parallel physical links comprise backplane traces. In some embodiments, the physical links are configured as an Ethernet link aggregation (LAG) group. Distribution of frames to individual physical links typically comprises applying a suitable mapping function, such as a hashing function. The mapping function typically uses frame attributes, such as various header fields of the frame, to determine a physical link over which to send each frame.

Unlike some known network element configurations, in which each user port is fixedly assigned to a specific backplane trace, the load balancing operation in embodiments of the present invention enables statistical multiplexing of the frames, in which there is no direct relationship or connection between user ports and backplane traces.

In some embodiments, two or more physical user ports are aggregated into a LAG group external to the network element, so as to form an aggregated user port having a higher bandwidth. The frames to and from the aggregated user port are distributed among the physical user ports of the external LAG group to balance the load and enable higher bandwidth and higher QoS. In the downstream direction, a combined mapping operation for frames addressed to the aggregated user port determines an individual backplane trace and a physical user port over which to send each frame in a single mapping computation.

Several system configurations that implement the disclosed methods are described hereinbelow. Bandwidth allocation considerations for allocating sufficient bandwidth in the various resources of the network element are also described and demonstrated.

Although some of the embodiments described herein relate specifically to access concentrators, aspects of the present invention are also applicable to link aggregation performed by network elements of other sorts.

There is therefore provided, in accordance with an embodiment of the present invention, a method for communication, including:

coupling a network node to one or more interface modules using a first group of first physical links arranged in parallel;

coupling each of the one or more interface modules to a communication network using a second group of second physical links arranged in parallel;

receiving a data frame having frame attributes sent between the communication network and the network node;

selecting, in a single computation based on at least one of the frame attributes, a first physical link out of the first group and a second physical link out of the second group; and sending the data frame over the selected first and second physical links.

In an embodiment, the network node includes a user node, and sending the data frame includes establishing a communication service between the user node and the communication network.

In another embodiment, the second physical links include backplane traces formed on a backplane to which the one or more interface modules are coupled.

In yet another embodiment, at least one of the first and second groups of physical links includes an Ethernet link aggregation (LAG) group.

In still another embodiment, coupling the network node to the one or more interface modules includes aggregating two or more of the first physical links into an external Ethernet LAG group so as to increase a data bandwidth provided to the network node.

In an embodiment, coupling each of the one or more interface modules to the communication network includes at least one of multiplexing upstream data frames sent from the network node to the communication network, and demultiplexing downstream data frames sent from the communication network to the network node.

In another embodiment, selecting the first and second physical links includes balancing a frame data rate among at least some of the first and second physical links.

In an embodiment, selecting the first and second physical links includes applying a mapping function to the at least one of the frame attributes. In another embodiment, applying the mapping function includes applying a hashing function. In still another embodiment, applying the hashing function includes determining a hashing size responsively to a number of at least some of the first and second physical links, applying the hashing function to the at least one of the frame attributes to produce a hashing key, calculating a modulo of a division operation of the hashing key by the hashing size, and selecting the first and second physical links responsively to the modulo. In an embodiment, selecting the first and second physical links responsively to the modulo includes selecting the first and second physical links responsively to respective first and second subsets of bits in a binary representation of the modulo.

In an embodiment, the at least one of the frame attributes includes at least one of a layer 2 header field, a layer 3 header field, a layer 4 header field, a source Internet Protocol (IP) address, a destination IP address, a source medium access control (MAC) address, a destination MAC address, a source Transmission Control Protocol (TCP) port and a destination TCP port.

In another embodiment, coupling the network node to the one or more interface modules and coupling each of the one or more interface modules to the communication network include specifying bandwidth requirements including at least one of a committed information rate (CIR), a peak information rate (PIR) and an excess information rate (EIR) of a communication service provided by the communication network to the network node, and allocating a bandwidth for the communication service over the first and second physical links responsively to the bandwidth requirements.

There is additionally provided, in accordance with an embodiment of the present invention, a method for connecting user ports to a communication network, including:

coupling the user ports to one or more user interface modules;

coupling each user interface module to the communication network via a backplane using two or more backplane traces arranged in parallel;

receiving data frames sent between the user ports and the communication network, the data frames having respective frame attributes;

for each data frame, selecting responsively to at least one of the respective frame attributes a backplane trace from the two or more backplane traces; and sending the data frame over the selected backplane trace.

Apparatus for connecting a network node with a communication network and for connecting user ports to a communication network are also provided.

The present invention will be more fully understood from the following detailed description of the embodiments thereof, taken together with the drawings in which:

BRIEF DESCRIPTION OF THE DRAWINGS

FIGS. 1 and 2 are block diagrams that schematically illustrate communication systems, in accordance with embodiments of the present invention;

FIG. 5 is a block diagram that schematically illustrates bandwidth allocation aspects of a communication system, in accordance with an embodiment of the present invention.

DETAILED DESCRIPTION OF EMBODIMENTS

System Description

Figure 3:
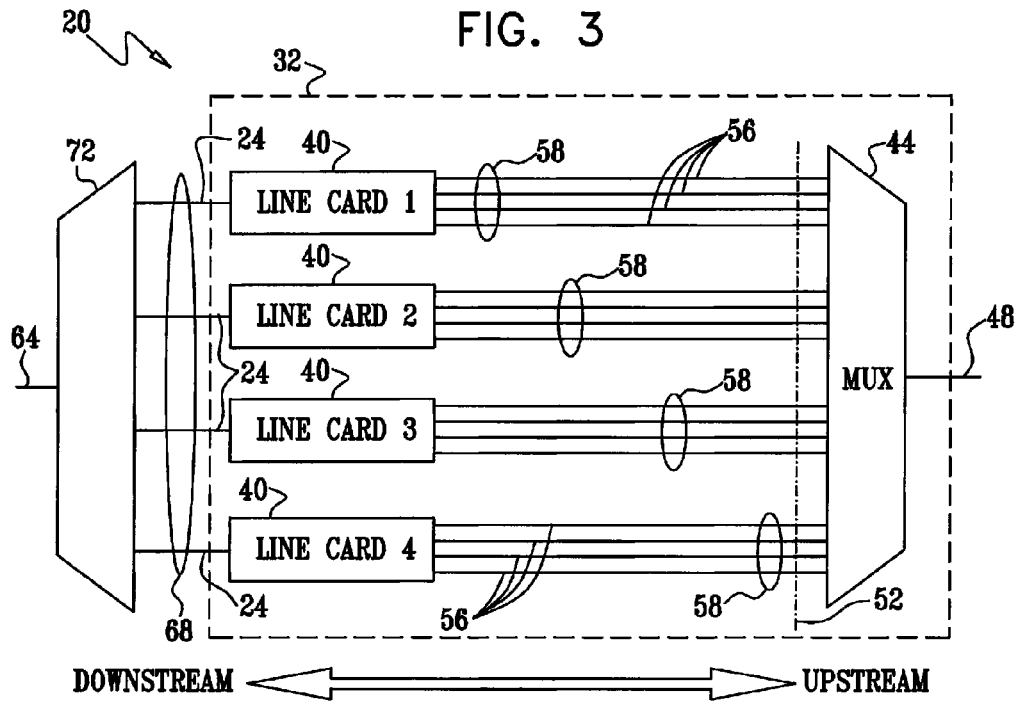
FIG. 3 is a block diagram that schematically illustrates elements of a communication system, in accordance with an embodiment of the present invention.

FIG. 1 is a block diagram that schematically illustrates a communication system 20, in accordance with an embodiment of the present invention. System 20 interconnects a plurality of user ports 24 to a communication network 28. Network 28 may comprise a wide-area network (WAN), such as the Internet, a network internal to a particular organization (Intranet), or any other suitable communication network.

A network element 32, such as an access concentrator, connects user ports 24 to a node 36 in network 28, typically via a network processor (NP) 38. Node 36 may comprise any suitable network element, such as a switch. The network element enables bi-directional communication in both upstream (i.e., user ports to network 28) and downstream (network 28 to user ports) directions.

In some embodiments, system 20 provides data services to users via network element 32. Typically, the system uses a Layer 2 communication protocol, such as an Ethernet™ communication protocol, in which data is transferred among the different system components using Ethernet frames. In some cases, services use higher level protocols, such as Multi-protocol label switching (MPLS). Alternatively, the Internet Protocol (IP) or other layer 2 or layer 3 protocols may also be used.

Network element 32 comprises one or more user interface modules (UIMs), such as line cards 40. Each line card is assigned to process data frames of one or more user ports. In some embodiments, the line cards are plugged into, mounted on, or otherwise coupled to a backplane 52, which distributes digital signals carrying the frames to and from line cards 40. Backplane 52 comprises physical links, such as backplane traces 56, typically in the form of printed circuit board (PCB) conductors. Each backplane trace 56 has a finite bandwidth and can support a certain maximum frame throughput.

A multiplexer (MUX) 44 is coupled to backplane traces 56. In the upstream direction, MUX 44 multiplexes upstream frames coming out of line cards 40 to produce an upstream output. The upstream output is provided to network processor 38. The upstream output is then sent by network processor 38 via a network connection 48 to network 28. In the downstream direction, network processor 38 of network element 32 accepts a downstream input comprising downstream frames addressed to user ports 24 from node 36 through connection 48. MUX 44 sends each frame to the appropriate user port via the appropriate line-card, using methods which will be explained below.

In many cases, a particular line card is connected to MUX 44 using two or more parallel backplane traces, in order to support the total bandwidth of the user ports assigned to this line card. In general, the statistical distribution of frames sent over different backplane traces may differ significantly from trace to trace, even for traces that belong to the same line card. In order to improve the capacity of the line cards, and consequently of network element 32 as a whole, it is desirable to balance the load of frames sent over the different traces, so as to avoid situations in which a certain backplane trace is overloaded, while excess capacity is available on a neighboring trace.

In many cases, the bandwidth offered by network element 32 to its users is specified in terms of quality of service (QoS) figures of merit, such as a guaranteed bandwidth (sometimes denoted CIR—Committed Information Rate) and a peak bandwidth (sometimes denoted PIR—Peak Information Rate). An alternative definition sometimes specifies the excess information rate (EIR), wherein CIR+EIR=PIR. Balancing the frame load between backplane traces 56 reduces the probability of lost frames due to overloading of backplane traces. The load balancing thus improves the QoS figures of merit, increases the quality of service offered by the concentrator and/or enables a higher bandwidth for a given QoS.

One way of balancing the load is to distribute the data rate of the Ethernet frames as uniformly as possible among the backplane traces. Alternatively, any other load balancing criterion can be used. In order to achieve load balancing, each group of backplane traces belonging to a particular line card is configured as an Ethernet link aggregation (LAG) group 58. Each LAG group 58 is considered by the relevant line card and by multiplexer 44 to be a single logical link having an aggregated bandwidth (i.e., capacity) equal to the sum of the bandwidths of the individual backplane traces in the group. As a result, there is no pre-assigned relationship or connection between any given user port 24 and a specific backplane trace 56, as in some conventional network elements. Ethernet frames are statistically multiplexed so as to balance the load among the backplane traces.

In some embodiments, Ethernet frames are mapped to individual backplane traces in the LAG group in accordance with a suitable mapping function, such as a hashing function. The mapping function distributes the frames among the different backplane traces so as to balance the load between the traces. In some embodiments, the mapping function hashes one or more frame attributes, such as header fields of the Ethernet frame, to produce a hashing key. The hashing key corresponds to an index of the backplane trace over which the frame is to be sent. Header fields may comprise any suitable layer 2, 3 or 4 headers of the Ethernet frame, such as source Internet Protocol (IP) address, destination IP address, source medium access control (MAC) address, destination MAC address, source Transmission Control Protocol (TCP) port and destination TCP port, MPLS label, virtual circuit (VC) label, virtual local area network identification (VLAN-ID) tag, as well as any other suitable header field.

In some embodiments, in the upstream direction, each line card 40 performs an upstream mapping of upstream frames to the individual backplane traces in its LAG group using a suitable mapping function. The mapping function typically uses attributes of the upstream frames, as described above.

In some embodiments, in the downstream direction, a control module 60 in network element 32 determines a downstream mapping of each downstream frame received through connection 48 to the appropriate backplane trace, using a suitable mapping function. The mapping performed by module 60 should naturally consider the user port to which the frame is addressed, in order to send the frame to the line card serving this user port. Module 60 controls multiplexer 44 in order to send each frame over the appropriate backplane trace. In addition to determining the appropriate line card for each frame (i.e., determining over which LAG group 58 to send the frame), the downstream mapping also balances the load of frames within each LAG group, responsively to attributes of the downstream frames.

For example, the downstream mapping can be implemented in two sequential stages. First, for each Ethernet frame, module 60 determines the appropriate line card to which the frame should be sent, depending on the destination user port. Then, within the backplane traces belonging to the LAG group of the appropriate line card, module 60 selects a particular trace and controls MUX 44 to send the frame over the selected trace. Alternatively, any other suitable mapping method can be used by module 60.

Control module 60 may be implemented in hardware, as software code running on a suitable processor, or as a combination of hardware and software elements. Module 60 may comprise an independent module, or be integrated with other components of network element 32. Different embodiments of network element 32 may comprise any number of line cards 40. Each line card may serve any number of user ports 24 and any number of backplane traces 56. In general, there need not be a direct relation between the number of user ports and the number of backplane traces. Each user port and each backplane trace may have any suitable bandwidth. User ports can have equal or different bandwidths. Similarly, the backplane traces within each LAG group 58 can have equal or different bandwidths.

FIG. 2 is a block diagram that schematically illustrates communication system 20, in accordance with another embodiment of the present invention. In some cases, a particular user requires a bandwidth higher than the bandwidth of a single user port 24. For this purpose, in the exemplary embodiment of FIG. 2, a number of user ports 24 are configured to form an aggregated user port 64. User ports 24 forming port 64 are configured as an Ethernet LAG group, referred to as an external LAG group 68. Thus, the bandwidth of port 64 is generally equal to the sum of bandwidths of the individual user ports 24 in external LAG group 68, in both upstream and downstream directions.

External LAG group 68 may comprise any number of user ports 24, belonging to any number of line cards 40. In general, a particular line card 40 may have some of its user ports 24 assigned to an external LAG group and other user ports 24 used individually or assigned to another external LAG group.

An external multiplexer (MUX) 72 performs the multiplexing and de-multiplexing (mapping) functions of the external LAG group. MUX 72 is external to network element 32 and is often located in user equipment 76, separate and distinct from network element 32. Aggregated port 64 is typically connected on the downstream side to a user node, such as a layer 2 or layer 3 switch (not shown).

In the downstream direction, MUX 72 multiplexes the downstream frames arriving over the user ports of external LAG group 68 to port 64. In the upstream direction, MUX 72 applies a suitable mapping function, such as a hashing function, to balance the load of upstream frames sent from port 64 over the different user ports of group 68. The mapping function uses attributes of the upstream frames, as explained above. Such load balancing helps to increase the upstream bandwidth of port 64 and/or its quality of service.

Single-Stage Downstream Mapping Method

In the system configuration of FIG. 2, consider the downstream frames arriving from network 28, via network processor 38, to multiplexer 44 and addressed to aggregated user port 64. In general, the processing of these frames in network element 32 comprises two consecutive mapping operations. First, each frame is mapped to one of user ports 24 in external LAG group 68. Determining the user port implicitly determines through which line card 40 the frame will pass. Then, the same frame is mapped to one of backplane traces 56 in the appropriate LAG group 58 that serves the selected line card. In some embodiments, in order to reduce the hardware complexity and/or computational complexity of network element 32, control module 60 performs a single combined mapping operation that combines the two mapping operations described above.

Thus, the combined mapping comprises a single hashing operation that determines, for each such downstream frame, both the backplane trace 56 over which the frame is to be sent to one of line cards 40, and the user port 24 to be used within external LAG group 68.

FIG. 3 is a block diagram that schematically illustrates elements of system 20, in accordance with an embodiment of the present invention. FIG. 3 is a simplified diagram, shown for the purpose of explaining the single-stage hashing method. As such, system elements unnecessary for explaining the method are omitted from the figure. The exemplary configuration of network element 32 in FIG. 3 comprises four line cards 40. Each line card is connected to MUX 44 using four backplane traces 56. The four backplane traces of each line card are configured as a LAG group. Each line card 40 serves a single user port 24. The four user ports are configured as an external LAG group to form aggregated user port 64, as explained above.

Figure 4:
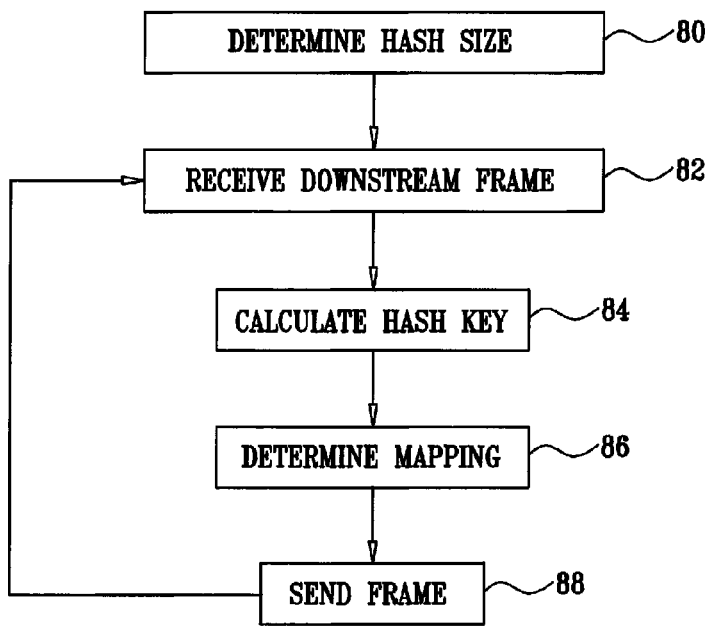
FIG. 4 is a flow chart that schematically illustrates a method for single-stage hashing, in accordance with an embodiment of the present invention.

FIG. 4 is a flow chart that schematically illustrates a method for single-stage downstream hashing, in accordance with an embodiment of the present invention. Although the following description demonstrates the method using the simplified system configuration of FIG. 3 above, the method can also be applied in any other system configuration comprising two stages of link aggregation, such as the configurations discussed in the descriptions of FIGS. 1 and 2 above.

The method begins with control module 60 determining a hashing size parameter denoted $N_{bpow}$, at a hash size definition step 80. $N_{bpow}$ is defined as $N_{bpow}=N_{extp} \cdot N_{bpt}$, wherein $N_{extp}$ denotes the number of user ports in external LAG group 68, and $N_{bpt}$ denotes the number of backplane traces 56 in each LAG group 58. For simplicity, it is assumed that all line cards 40 having a user port in external LAG group 68 have the same number of backplane traces 56 connecting them to MUX 44. In the present example, $N_{extp}=4$, $N_{bpt}=4$, therefore $N_{bpow}=16$.

In different embodiments of network element 32, the value of hashing size $N_{bpow}$ can be hard-wired in the concentrator design. Alternatively, the hashing size can be provided to the network element as part of its configuration, or determined by control module 60 responsively to the configuration setting of network element 32, as detected by module 60. In general, different line cards 40 may comprise different numbers of user ports belonging to external LAG group 68.

During normal operation, network element 32 receives downstream frames via network connection 36, at a frame reception step 82. For each downstream frame, control module 60 calculates a hashing key of the frame, at a hash key calculation step 84. As explained above, the hashing key is typically calculated by applying a suitable hashing function to the frame attributes of the downstream frame.

Module 60 performs an integer modulo-$N_{bpow}$ division of the hashing key, at a mapping calculation step 86. Module 60 divides the hashing key of the downstream frame by $N_{bpow}$ and retains the modulo, or the remainder of the division operation, as a mapping index. The mapping index can be represented as a binary number having a fixed number of bits, depending on the value of $N_{bpow}$. In the present example in which $N_{bpow}=16$, the mapping index, being a remainder after division by 16, is an integer number in the range 0 . . . 15, which can be represented using 4 bits.

Module 60 partitions the binary representation of the mapping index into two parts having N1 and N2 bits. Module 60 uses N1 bits as a user slot/port index, indicating over which user port 24 in external LAG group 68 the frame should be sent. The remaining N2 bits are used as a backplane trace index, indicating over which of the backplane traces of the relevant line card the frame should be sent. In the present example, the four bit mapping index is partitioned so that two bits encode the user port and two bits encode the backplane trace. In other words, N1=N2=2. The user port index and the backplane trace index jointly define the combined mapping operation for determining how the particular downstream frame is to be handled. Alternatively, module 60 can apply any other suitable method for determining the combined mapping responsively to the frame attributes.

Having determined the combined mapping, module 60 controls MUX 44 so as to send the downstream frame, at a frame sending step 88. MUX 44 sends the frame to the appropriate line card over the appropriate backplane trace, responsively to the user port index and the backplane trace index, respectively. In some embodiments, MUX 44 sends the user port index to the line card along with the frame. The line card then selects the user port over which to send the frame to aggregated port 64 responsively to the user port index.

After sending the frame over the appropriate backplane trace and user port, the method returns to reception step 82 to process the next downstream frame.

Bandwidth Allocation Considerations

FIG. 5 is a block diagram that schematically illustrates bandwidth allocation aspects in communication system 20, in accordance with an embodiment of the present invention. In the exemplary configuration of FIG. 5, network element 32 comprises two line cards 100 and 101, each having a similar structure and functionality to line cards 40 of FIGS. 1-3 above. Network element 32 connects network 28 with a user node, in the present example comprising a layer-2 switch 102. Port 64 is served by three user ports 24 configured as an external LAG group 68. As explained above, frames sent between switch 102 and network 28 undergo two stages of link aggregation. In addition to port 64, network element 32 also supports an independent user port 104 on line card 101. Frames sent between port 104 and network 28 undergo link aggregation only once.

Each of user ports 24 and 104 is coupled to a respective queue 106, which queues the frames of this port. In some embodiments, each port may have separate queues for upstream and downstream frames. Each line card comprises a link aggregator 108, which performs the aggregation of backplane traces 56 of this line card into the respective LAG group 58 in both upstream and downstream directions.

The configuration shown in FIG. 5 is an exemplary configuration chosen for the sake of simplicity. The bandwidth allocation calculations given below can be used in conjunction with any other suitable configuration of system 20, such as configurations having different numbers and arrangements of line cards, user ports, aggregated user ports and backplane traces.

Consider a particular communication service provided by network 28 to aggregated port 64. The bandwidth allocation of this communication service is commonly specified in terms of CIR and PIR or CIR and EIR figures-of-merit, as explained above. In order to provide these bandwidths at the specified quality-of-service, it is desirable to allocate sufficient bandwidth in the different physical resources used for transferring the frames. These resources comprise, for example, user ports 24, backplane traces 56 and different queues 106 in line cards 100 and 101. In some embodiments, a high quality of service is achieved by defining suitable bandwidth margins for the different physical resources. The following description details an exemplary calculation for allocating sufficient bandwidth to the different resources of system 20. Alternatively, any other suitable bandwidth allocation method can be used.

In the upstream direction, let $BW_{SERVICE}$ denote the total bandwidth of the communication service in question. ($BW_{SERVICE}$ may refer to the CIR, EIR or PIR of the service, as applicable. Similarly, the different bandwidth calculations given throughout the description below may be used to allocate CIR, EIR or PIR to the different system resources.) Upstream frames belonging to this service originating from switch 102 are mapped and distributed by MUX 72 among the three user ports 24 of external LAG group 68. In theory, the mapping operation should distribute the frames evenly among the user ports, so that each port receives a bandwidth of $BW_{SERVICE}/3$. In practice, however, the actual bandwidth distribution may deviate significantly from these values. In particular, deviations are likely to occur in embodiments in which the mapping operation is a data-dependent operation, such as hashing.

Therefore, in order to account for these deviations, each of the three user ports of external LAG group 68 is allocated a higher bandwidth given by:

$$BW_{ELAGPORT} = (BW_{SERVICE}/3) \cdot MARGIN_{UPELAG} \quad [1]$$

wherein $MARGIN_{UPELAG}$ denotes an upstream bandwidth margin of each user port 24 in the external LAG group. (In other words, $MARGIN_{UPELAG}=1.5$ corresponds to a 50% bandwidth margin.) In general, the bandwidth allocated to a particular user port 24 should also be allocated to the respective queue 106 that queues the frames of this port.

After being mapped and sent over one of user ports 24, the upstream frames are processed by one of line cards 100 and 101. As part of this processing, the frames are mapped again by link aggregator 108 in the line card, so as to distribute them among the four backplane traces 56 of LAG group 56. It is thus desirable to allocate sufficient bandwidth on each of backplane traces 56. Assuming an optimal (uniform) distribution among the backplane traces, the bandwidth received by each backplane trace can be written as $BW_{ELAGPORT}*\#PORTS_{ELAG}/\#BPT$, wherein $\#PORTS_{ELAG}$ denotes the number of user ports of external LAG group 68 that are processed by the particular line card, and $\#BPT$ denotes the number of backplane traces 56 in the LAG group 58 of this line card.

Since, as explained above, the actual distribution achieved by the mapping operation (in this case, the mapping between backplane traces performed by aggregator 108) often deviates from uniform distribution, a suitable margin denoted $MARGIN_{UPBPLAG}$ is added. Thus, the bandwidth allocation of each backplane trace can be written as $BW_{ELAGPORT}*\#PORTS_{ELAG}*MARGIN_{UPBPLAG}/\#BPT$, wherein $\#PORTS_{ELAG}$ denotes the number of user ports in the particular line card. In some cases, however, this bandwidth allocation is greater than $BW_{SERVICE}$, the total bandwidth of the communication service. Clearly there is no need to assign to any single backplane trace a bandwidth that is greater than the total service bandwidth. Therefore, the bandwidth allocated to each backplane trace can be written as:

$$BW_{BPT} = \mathrm{Min}\left\{ \begin{array}{l} BW_{ELAGPORT} \cdot \# \ PORTS_{ELAG} \cdot \\ MARGIN_{UPBPLAG} / \# \ BPT, BW_{SERVICE} \end{array} \right\} \quad [2]$$

Note that according to equation [1], $BW_{ELAGPORT}$ already contains $MARGIN_{UPELAG}$, the bandwidth margin of the external LAG. $\#PORTS_{ELAG}$ refers to the specific line card in question.

The total bandwidth allocated on LAG group 56 is thus given by $$BW_{BPLAG} = \mathrm{Min}\left\{ \begin{array}{l} BW_{ELAGPORT} \cdot \# \ PORTS_{ELAG} \cdot \\ MARGIN_{UPBPLAG} / \# \ BPT, BW_{SERVICE} \end{array} \right\} \cdot \# \ BPT \quad [3]$$

In cases where external LAG is not used, such as for upstream frames originating from independent port 104, the total bandwidth allocated on LAG group 56 is given by the simpler expression:

$$BW_{BPLAG} = \mathrm{Min}\left\{ \begin{array}{l} BW_{SERVICE} \cdot MARGIN_{UPBPLAG} / \\ \# \ BPT, BW_{SERVICE} \end{array} \right\} \cdot \# \ BPT \quad [4]$$

In the downstream direction, as explained above, downstream frames undergo only a single mapping operation. When external LAG is used, using a similar calculation, the total bandwidth allocated to LAG group 56 for downstream frames of a particular service can be written as:

$$BW_{BPLAG} = \mathrm{Min}\left\{ \begin{array}{l} BW_{ELAGPORT} \cdot \# \ PORTS_{ELAG} \cdot / \\ \# \ BPT, BW_{SERVICE} \end{array} \right\} \cdot \# \ BPT \quad [5]$$

wherein a suitable downstream bandwidth margin is assumed to be already included in $BW_{ELAGPORT}$. When external LAG is not used, such as for downstream frames addressed to independent port 104, the total bandwidth allocation can be written as:

$$BW_{BPLAG} = \mathrm{Min}\left\{ \begin{array}{l} BW_{SERVICE} \cdot MARGIN_{DNBPLAG} / \\ \# \ BPT, BW_{SERVICE} \end{array} \right\} \cdot \# \ BPT \quad [6]$$

wherein $MARGIN_{DNBPLAG}$ denotes a downstream bandwidth margin for the backplane traces, which may be the same as or different from $MARGIN_{UPBPLAG}$.

Although the methods and systems described herein mainly address link aggregation of backplane traces and external link aggregation in Ethernet communication systems, the principles of the present invention can also be used in any system configuration in which a user interface module connects one or more user ports to a communication network via two or more parallel physical links. In particular, the principles of the present invention can also be used in other applications involving the selection of physical links in two successive link aggregation stages using a single computation.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:
1. A method for communication, comprising:
coupling a network node to one or more interface modules using a first group of first physical links arranged in parallel, at least one of said first physical links being a bi-directional link operative to communicate in both an upstream direction and a downstream direction;

coupling each of the one or more interface modules to a communication network using a second group of second physical links arranged in parallel, at least one of said second physical links being a bi-directional link operative to communicate in both an upstream direction and a downstream direction;

receiving a data frame having frame attributes sent between the communication network and the network node;

selecting, in a single computation based on at least one of the frame attributes, a first physical link out of the first group and a second physical link out of the second group; and sending the data frame over the selected first and second physical links, said sending comprising communicating along at least one of said bi-directional links.

2. The method according to claim 1, wherein the network node comprises a user node, and wherein sending the data frame comprises establishing a communication service between the user node and the communication network.

3. The method according to claim 1, wherein the second physical links comprise backplane traces formed on a backplane to which the one or more interface modules are coupled.

4. A method for communication, comprising:

coupling a network node to one or more interface modules using a first group of first physical links arranged in parallel;

coupling each of the one or more interface modules to a communication network using a second group of second physical links arranged in parallel;

receiving a data frame having frame attributes sent between the communication network and the network node;

selecting, in a single computation based on at least one of the frame attributes, a first physical link out of the first group and a second physical link out of the second group; and sending the data frame over the selected first and second physical links, at least one of the first and second groups of physical links comprising an Ethernet link aggregation (LAG) group.

5. A method for communication, comprising:

coupling a network node to one or more interface modules using a first group of first physical links arranged in parallel;

coupling each of the one or more interface modules to a communication network using a second group of second physical links arranged in parallel;

receiving a data frame having frame attributes sent between the communication network and the network node;

selecting, in a single computation based on at least one of the frame attributes, a first physical link out of the first group and a second physical link out of the second group; and sending the data frame over the selected first and second physical links, coupling the network node to the one or more interface modules comprises aggregating two or more of the first physical links into an external Ethernet link aggregation (LAG) group so as to increase a data bandwidth provided to the network node.

6. The method according to claim 1, wherein coupling each of the one or more interface modules to the communication network comprises at least one of multiplexing upstream data frames sent from the network node to the communication network, and demultiplexing downstream data frames sent from the communication network to the network node.

7. The method according to claim 1, wherein selecting the first and second physical links comprises balancing a frame data rate among at least some of the first and second physical links.

8. The method according to claim 1, wherein selecting the first and second physical links comprises applying a mapping function to the at least one of the frame attributes.

9. The method according to claim 8, wherein applying the mapping function comprises applying a hashing function.

10. The method according to claim 9, wherein applying the hashing function comprises determining a hashing size responsively to a number of at least some of the first and second physical links, applying the hashing function to the at least one of the frame attributes to produce a hashing key, calculating a modulo of a division operation of the hashing key by the hashing size, and selecting the first and second physical links responsively to the modulo.

11. The method according to claim 10, wherein selecting the first and second physical links responsively to the modulo comprises selecting the first and second physical links responsively to respective first and second subsets of bits in a binary representation of the modulo.

12. The method according to claim 1, wherein the at least one of the frame attributes comprises at least one of a layer 2 header field, a layer 3 header field, a layer 4 header field, a source Internet Protocol (IP) address, a destination IP address, a source medium access control (MAC) address, a destination MAC address, a source Transmission Control Protocol (TCP) port and a destination TCP port.

13. A method for communication, comprising:

coupling a network node to one or more interface modules using a first group of first physical links arranged in parallel;

coupling each of the one or more interface modules to a communication network using a second group of second physical links arranged in parallel;

receiving a data frame having frame attributes sent between the communication network and the network node;

selecting, in a single computation based on at least one of the frame attributes, a first physical link out of the first group and a second physical link out of the second group; and sending the data frame over the selected first and second physical links, coupling the network node to the one or more interface modules and coupling each of the one or more interface modules to the communication network comprising specifying bandwidth requirements comprising at least one of a committed information rate (CIR), a peak information rate (PIR) and an excess information rate (EIR) of a communication service provided by the communication network to the network node, and allocating a bandwidth for the communication service over the first and second physical links responsively to the bandwidth requirements.

14. A method for connecting user ports to a communication network, comprising:

coupling the user ports to one or more user interface modules;

coupling each user interface module to the communication network via a backplane using two or more backplane traces arranged in parallel, at least one of said backplane traces being bi-directional and operative to communicate in both an upstream direction and a downstream direction;

receiving data frames sent between the user ports and the communication network, the data frames having respective frame attributes;

for each data frame, selecting responsively to at least one of the respective frame attributes a backplane trace from the two or more backplane traces; and sending the data frame over the selected backplane trace; said sending comprising communicating along said at least one of said backplane traces.

15. A method for connecting user ports to a communication network, comprising:

coupling the user ports to one or more user interface modules;

coupling each user interface module to the communication network via a backplane using two or more backplane traces arranged in parallel;

receiving data frames sent between the user ports and the communication network, the data frames having respective frame attributes;

for each data frame, selecting responsively to at least one of the respective frame attributes a backplane trace from the two or more backplane traces; and sending the data frame over the selected backplane trace, at least some of the backplane traces being aggregated into an Ethernet link aggregation (LAG) group.

16. The method according to claim 14, wherein selecting the backplane trace comprises applying a hashing function to the at least one of the frame attributes.

17. Apparatus for connecting a network node with a communication network, comprising:

one or more interface modules, which are arranged to process data frames having frame attributes sent between the network node and the communication network, at least one of said interface modules being operative to communicate in both an upstream direction and a downstream direction;

a first group of first physical links arranged in parallel so as to couple the network node to the one or more interface modules;

a second group of second physical links arranged in parallel so as to couple the one or more interface modules to the communication network; and a control module, which is arranged to select for each data frame sent between the communication network and the network node, in a single computation based on at least one of the frame attributes, a first physical link out of the first group and a second physical link out of the second group over which to send the data frame;

at least one of said first physical links and at least one of said second links being bi-directional links operative to communicate in both said upstream direction and said downstream direction.

18. The apparatus according to claim 17, and comprising a backplane to which the one or more interface modules are coupled, wherein the second physical links comprise backplane traces formed on the backplane.

19. Apparatus for connecting a network node with a communication network, comprising:

one or more interface modules, which are arranged to process data frames having frame attributes sent between the network node and the communication network;

a first group of first physical links arranged in parallel so as to couple the network node to the one or more interface modules;

a second group of second physical links arranged in parallel so as to couple the one or more interface modules to the communication network; and a control module, which is arranged to select for each data frame sent between the communication network and the network node, in a single computation based on at least one of the frame attributes, a first physical link out of the first group and a second physical link out of the second group over which to send the data frame, at least one of the first and second groups of physical links comprising an Ethernet link aggregation (LAG) group.

20. Apparatus for connecting a network node with a communication network, comprising:

one or more interface modules, which are arranged to process data frames having frame attributes sent between the network node and the communication network;

a first group of first physical links arranged in parallel so as to couple the network node to the one or more interface modules;

a second group of second physical links arranged in parallel so as to couple the one or more interface modules to the communication network; and a control module, which is arranged to select for each data frame sent between the communication network and the network node, in a single computation based on at least one of the frame attributes, a first physical link out of the first group and a second physical link out of the second group over which to send the data frame, two or more of the first physical links being aggregated into an external Ethernet link aggregation (LAG) group so as to increase a data bandwidth provided to the network node.

21. The apparatus according to claim 17, and comprising a multiplexer, which is arranged to perform at least one of multiplexing upstream data frames sent from the network node to the communication network, and demultiplexing downstream data frames sent from the communication network to the network node.

22. The apparatus according to claim 17, wherein the control module is arranged to balance a frame data rate among at least some of the first and second physical links.

23. The apparatus according to claim 17, wherein the control module is arranged to apply a mapping function to the at least one of the frame attributes so as to select the first and second physical links.

24. The apparatus according to claim 23, wherein the mapping function comprises a hashing function.

25. The apparatus according to claim 24, wherein the control module is arranged to determine a hashing size responsively to a number of at least some of the first and second physical links, to apply the hashing function to the at least one of the frame attributes to produce a hashing key, to calculate a modulo of a division operation of the hashing key by the hashing size, and to select the first and second physical links responsively to the modulo.

26. The apparatus according to claim 25, wherein the control module is arranged to select the first and second physical links responsively to respective first and second subsets of bits in a binary representation of the modulo.

27. The apparatus according to claim 17, wherein the at least one of the frame attributes comprises at least one of a layer 2 header field, a layer 3 header field, a layer 4 header field, a source Internet Protocol (IP) address, a destination IP address, a source medium access control (MAC) address, a destination MAC address, a source Transmission Control Protocol (TCP) port and a destination TCP port.

28. Apparatus for connecting a network node with a communication network, comprising:

one or more interface modules, which are arranged to process data frames having frame attributes sent between the network node and the communication network;

a first group of first physical links arranged in parallel so as to couple the network node to the one or more interface modules;

a second group of second physical links arranged in parallel so as to couple the one or more interface modules to the communication network; and a control module, which is arranged to select for each data frame sent between the communication network and the network node, in a single computation based on at least one of the frame attributes, a first physical link out of the first group and a second physical link out of the second group over which to send the data frame, the communication network being arranged to provide a communication service to the network node, the service having specified bandwidth requirements comprising at least one of a committed information rate (CR), a peak information rate (PIR) and an excess information rate (EIR), and the first and second groups of physical links being dimensioned to provide an allocated bandwidth for the communication service responsively to the bandwidth requirements.

29. Apparatus for connecting user ports to a communication network, comprising:

one or more user interface modules coupled to the user ports, which are arranged to process data frames having frame attributes sent between the user ports and the communication network, at least one of said user interface modules being bi-directional and operative to communicate in both an upstream direction and a downstream direction;

a backplane having the one or more user interface modules coupled thereto and comprising a plurality of backplane traces arranged in parallel so as to transfer the data frames between the one or more user interface modules and the communication network, at least one of said backplane traces being bi-directional and operative to communicate in both said upstream direction and said downstream direction; and a control module, which is arranged to select, for each data frame, responsively to at least one of the frame attributes, a backplane trace from the plurality of backplane traces over which to send the data frame.

30. Apparatus for connecting user ports to a communication network, comprising:

one or more user interface modules coupled to the user ports, which are arranged to process data frames having frame attributes sent between the user ports and the communication network;

a backplane having the one or more user interface modules coupled thereto and comprising a plurality of backplane traces arranged in parallel so as to transfer the data frames between the one or more user interface modules and the communication network;

a control module, which is arranged to select, for each data frame, responsively to at least one of the frame attributes, a backplane trace from the plurality of backplane traces over which to send the data frame;

at least some of the backplane traces are aggregated into an Ethernet link aggregation (LAG) group.

31. The apparatus according to claim 29, wherein the control module is arranged to apply a hashing function to the at least one of the frame attributes so as to select the backplane trace.

\* \* \* \* \*